Patented Nov. 6, 1934

1,979,248

UNITED STATES PATENT OFFICE 1,979,248

TEXTILE PRINTING

Oakley M. Bishop, Wilmington, Del., and Frank Willard Johnson, Pennsgrove, N. J., assignors to E. I. du Pont de Nemours & Company, Wilmington, Del., a corporation of Delaware No Drawing. Application July 23, 1930, Serial No. 470,222

16 Claims. (Cl. 8—6)

This invention relates to the art of textile printing and more particularly to the preparation of improved dyestuff pastes of the type used for the manufacture of textile printing pastes. Specifically it deals with color pastes made from vat dyes and which include glycerine as a printing assistant.

Textile printing differs from dyeing in that the color or colors applied are confined to certain parts of the material thus producing different designs or patterns. At the present time the most extensive textile printing is done with cylinder or roll printing machines. The fundamental principles in this art are simple and comprise passing the cloth to be printed under some tension and pressure over an intaglio metal roll, the engraving of which is filled with color printing paste. After leaving the printing machine the printed cloth is passed into a drier. This dries the paste on the cloth in its proper place and prevents the dye from spreading to other portions of the fabric. In order to complete the printing, the cloth, after leaving the drier, is passed into a steam ager for a period of a few minutes, during which time the vat color undergoes reduction and passes to the fibre. The fabric is then subjected to oxidizing conditions which may include passing it into a steeping bath, usually of water or water containing an oxidizing agent. Any excess color is washed off in a soap solution with which the textile material is treated following the steeping.

The paste applied by the printing roll, hereinafter called "printing paste", varies with different materials and manufacturers, but usually consists of the mixture of unreduced vat dyestuff, a strong reducing agent such as sodium hydrosulphite or Rongalite, an alkali and a thickening agent. The thickening agent is usually a gum (for instance British gum), starch or both. The printing paste is usually prepared by mixing dyestuff paste or pastes with the other ingredients enumerated, said other ingredients being in the form of a gummy mixture hereinafter called "printing gum". The dyestuff pastes are essentially finely divided suspensions of dye with or without a dispersing agent. These dyestuff pastes (hereinafter referred to as "dyestuff pastes" or "color pastes") usually have the dye suspended in water, but in certain instances part of the water necessary for the suspension may be replaced by other fluids. These fluids are generally (and hereinafter) called "printing assistants". As an example of a color paste containing a printing assistant see U. S. Patent 1,705,818 of March 19, 1929, to Kern and Sala.

It is an object of this invention to produce improved dyestuff pastes. Further objects are to produce dyestuff paste assistants of wide range of applicability, to produce cold-dyeing-dyestuff color pastes, to produce dyestuff paste assistants suitable for use with dyes regardless of particle form, to improve textile printing pastes, to produce printing pastes more subject to reduction and in general to improve upon the prior art. Still further objects are to prevent drying out, hardening, settling and coagulation of color pastes. Other objects will appear hereinafter.

These objects are accomplished by the present invention whereby vat dyestuff pastes are produced which contain glycerine, soap, or both. The ether known as di-glycerine may also be used.

In preparing this paste the wet press-cake resulting from the separation of the dyestuff in very finely divided condition is mixed with the printing assistant of this invention, and then water is evaporated (preferably under vacuum) until the desired concentration is produced. A second satisfactory method of producing this improved color paste comprises thinning the press-cake by means of a dispersing agent, bringing the resultant mixture to a uniform condition and adding the printing assistant after which water is evaporated to obtain a product of suitable composition. The invention will be readily understood from the following examples.

Example I

The following ingredients in the proportions indicated were mixed in an evaporator and 600 lbs. of water evaporated.

| | Lbs. |
|---|---|
| Ponsol yellow G (Schultz No. 849—C. I. No. 1118) standard paste containing about 21% dyestuff | 1000 |
| Glycerine | 600 |

Example II

The following ingredients were mixed in the proportions indicated and 600 pounds of water evaporated.

| | Lbs. |
|---|---|
| Ponsol brown AR (Color Index No. 1151) double paste containing approximately 22% of dry dyestuff | 1000 |
| Glycerine | 600 |

Example III

The following ingredients were mixed in a vacuum evaporator and 560 pounds of water evaporated.

| | Lbs. |
|---|---|
| The press cake resulting from the manufacture of Ponsol blue GD (Color Index No. 1113) and containing 25% dry color | 1000 |
| Glycerine | 955 |
| Castor-oil soap | 74 |

Example IV

The following ingredients were mixed in a vacuum evaporator and 650 lbs. of water evaporated.

| | Lbs. |
|---|---|
| Ponsol brilliant violet RR (Color Index No. 1104) standard paste containing about 10% dyestuff | 1000 |
| Glycerine | 600 |
| Castor-oil soap | 50 |

Example V

The following ingredients were mixed in a vacuum evaporator and 560 lbs. of water evaporated.

| | Lbs. |
|---|---|
| Ponsol golden orange RRT (Color Index No. 1097) standard paste containing 10% dyestuff | 1000 |
| Glycerine | 500 |
| Castor-oil soap | 60 |

Example VI

The following ingredients were mixed in a vacuum evaporator and 550 lbs. of water evaporated.

| | Lbs. |
|---|---|
| Ponsol yellow G (Color Index No. 1118) standard paste containing about 21% dyestuff | 1000 |
| Glycerine | 500 |
| Castor-oil soap | 50 |

Example VII

The following ingredients in the proportions indicated were mixed in a vacuum evaporator and 540 lbs. of water evaporated.

| | Lbs. |
|---|---|
| Ponsol brilliant violet 2R (Schultz No. 767, C. I. No. 1104) standard paste containing about 10% dyestuff | 1000 |
| Glycerine | 500 |
| Potassium oleate | 40 |

Example VIII

The following ingredients were mixed and 550 lbs. of water evaporated.

| | Lbs. |
|---|---|
| Ponsol red BN (Color Index No. 1162) (Schultz No. 831) double paste containing about 21% of dry dyestuff | 1000 |
| Glycerine | 500 |
| Tri-ethanolamine soap | 50 |

Example IX

The following ingredients were mixed in a vacuum evaporator and 450 pounds of water evaporated.

| | Lbs. |
|---|---|
| Ponsol blue GD (Schultz No. 842—C. I. No. 1113) standard paste containing about 18% dyestuff | 1000 |
| Diglycerol | 400 |
| Castor-oil soap | 50 |

The printing assistants of this invention are of value in vat dyestuff pastes in general. Specifically they are valuable in indigo colors, thio-indigo colors, and the anthraquinone dyes including the so-called cold-dyeing colors.

Both glycerine and di-glycerine may be used but the use of glycerine is preferred. If desired a mixture of the two may be utilized.

The presence of soap has a very definite value in that it increases the strength in light shades but amounts larger than approximately 10% apparently give no added value and produce thickening of the starch-gum-dyestuff printing paste mixture. This thickening is undesirable. Preferably 5 to 8% of soap is used. While any soap is advantageous it is best to use a soft, very soluble soap (castor oil soap has these properties and has given excellent results). The approximately pure alkali metal salts of the higher fatty acids may be used as shown in the above examples. It is also possible to use with some success soap-like compounds, for example, the tri-ethanolamine soap disclosed in the above examples. Other suitable soaps are those of the type formed by treating ricinoleic acid, sulfo-ricinoleic acid, or the fatty acids such as oleic acid with mono-, di-, or tri-ethanolamine or mixtures of such amines.

Dyestuff pastes are usually prepared with a dispersing agent and when so prepared are used advantageously in this invention but improved results are also obtained in the absence of a dispersing agent.

It will be understood that the amount of glycerine and soap in the product can be varied within the indicated limits. Considerable improvement is effected by the incorporation of glycerine alone. Soap may be used in the absence of glycerine with desirable results. The best results have been obtained in the case of most dyestuffs when a large proportion of the final paste consists of glycerine, for example, 50 to 75%, although as low as 20–30% glycerine may be used in some instances with satisfactory results.

It is known that small amounts of glycerine are commonly used in the starch gum thickening used by printers for a mixture of printing paste. This invention is distinguished therefrom, in that the assistant is added, to the color paste and not to the printing paste.

Comparative tests under otherwise identical conditions show that printing pastes prepared from glycerine dyestuff pastes give results which are greatly superior to printing pastes of identical composition but prepared from aqueous dyestuff pastes.

As shown in the Kern and Sala patent, above referred to, very small amounts of glycerine have heretofore appeared in color paste along with a printing assistant, but the use of glycerine alone, or large amounts of glycerine as the printing assistant has not heretofore been disclosed.

The dyestuff may be in any of its various physical forms such as for example, that produced by drowning the sulfuric acid solution of the dye in water, filtering off the dye and washing acid free; or by slow oxidation of the crystals of the leuco salt, etc.

A great many advantages are gained with this new printing assistant. The following may be mentioned:

1. The advantage to the manufacturer is that the paste may be made up from the dyestuff in whatever physical form it is produced.

2. Color pastes produced according to this invention are non-drying, non-caking, non-settling and non-agglomerating.

3. Prints obtained from pastes embodying this invention are stronger and brighter than it has heretofore been possible to obtain.

4. Dyestuffs which have heretofore been considered unsuitable for printing e. g. the cold-dyeing colors are now made available to the art by this invention.

5. The color pastes remain in suitable physical condition for textile printing indefinitely.

6. The fact that glycerine and soap are commercially available at low prices renders their use desirable.

7. Dyestuff pastes made according to this invention give more complete utilization of the color, give better penetration of the fiber and give more level prints.

8. In processing dyestuff pastes it is possible to obtain more intimate mixtures of the paste ingredients with glycerine than with water. Furthermore, glycerine pastes have more homogeneity and smoothness than aqueous pastes.

As many apparently widely different embodiments of this invention may be made without departing from the spirit and scope thereof, it is to be understood that we do not limit ourselves to the specific embodiments thereof except as defined in the appended claims.

We claim:

1. Fabric having thereon a printing paste comprising an anthraquinone vat color paste containing in excess of 20% glycerine as a printing assistant.

2. A dyestuff paste comprising Ponsol blue GD, between 40-75% glycerine and about 5% liquid soap.

3. A dyestuff paste comprising Ponsol brilliant violet 2R, between 40-75% glycerine and about 5% liquid soap.

4. A dyestuff paste comprising Ponsol brown AR, and between 40-75% glycerine.

5. A dyestuff paste comprising an anthraquinone vat dye, in excess of 20% glycerine and water, and a dispersing agent.

6. A color paste comprising an anthraquinone vat dye, and in excess of 20% glycerine.

7. A dyestuff paste comprising an anthraquinone vat dye, soap, in excess of 20% glycerine and water, and a dispersing agent.

8. A color paste comprising an anthraquinone vat dye, soap, and in excess of 20% glycerine.

9. A dyestuff paste comprising Ponsol brown AR, a dispersing agent and between 40-75% glycerine.

10. A dyestuff paste comprising a member of the group consisting of Ponsol blue GD, Ponsol brilliant violet 2R and Ponsol brown AR, and glycerine in excess of 20%.

11. A dyestuff paste comprising an anthraquinone vat dye containing chlorine and in excess of 20% glycerine.

12. An anthraquinone vat dye containing a cyclic nitrogen atom and in excess of 20% glycerine.

13. The process which comprises applying to a fabric a composition of matter comprising a printing paste having as a component a dyestuff paste comprising an anthraquinone vat dye and in excess of 20% glycerine.

14. The process of claim 13 in which the anthraquinone vat dye contains chlorine.

15. The process of claim 13 in which the anthraquinone vat dye contains chlorine and also contains a cyclic nitrogen atom.

16. In the preparation of anthraquinone vat color printing pastes the step of mixing with the other ingredients an anthraquinone vat color paste containing in excess of 20% glycerine as a printing assistant.

OAKLEY M. BISHOP.
F. WILLARD JOHNSON.